United States Patent [19]

Guenther

[11] 4,036,184
[45] July 19, 1977

[54] STRATIFIED CHARGE ENGINE

[75] Inventor: William D. Guenther, Hagerstown, Ind.

[73] Assignee: Dana Corporation, Toledo, Ohio

[21] Appl. No.: 532,391

[22] Filed: Dec. 13, 1974

Related U.S. Application Data

[63] Continuation-in-part of Ser. No. 449,241, March 8, 1974, Pat. No. 3,948,227.

[51] Int. Cl.² ............... F02M 13/06; F02B 19/10; F01L 7/00
[52] U.S. Cl. .................. 123/75 B; 123/190 A; 123/190 BF; 123/190 E; 123/190 R; 123/32 SP; 123/80 BA
[58] Field of Search ......... 123/190 A, 190 B, 190 BB, 123/75 B, 32 ST, 32 SP, 190 R, 80 BA, 190 BO, 190 D, 190 C, 127, 33 VC

[56] References Cited

U.S. PATENT DOCUMENTS

| | | | |
|---|---|---|---|
| 1,030,927 | 7/1912 | Seeley | 123/190 A |
| 1,077,317 | 11/1913 | Swenson | 123/190 A |
| 1,245,257 | 11/1917 | Miller | 123/190 A |
| 1,578,581 | 3/1926 | Casna | 123/190 A |
| 1,890,326 | 12/1932 | Hansen | 123/190 A |
| 1,917,816 | 7/1933 | Spears | 123/190 A |
| 2,007,608 | 7/1935 | Kettering | 123/75 B |
| 2,155,143 | 4/1939 | McDermett | 123/190 B |
| 3,842,810 | 10/1974 | Vagi | 123/32 SP |
| 3,896,781 | 7/1975 | Smith | 113/32 SP |

Primary Examiner—Ronald B. Cox
Attorney, Agent, or Firm—Owen, Purdue, Emch & Barker Co.

[57] ABSTRACT

An apparatus for applying a stratified charge to a reciprocating internal combustion engine is disclosed. The apparatus comprises a cylindrical rotary valve body disposed for rotation within the head of an internal combustion engine. The valve body defines first and second inlet ports and an exhaust port. The first inlet port is disposed, upon rotation in the valve body, to establish communication between an intake manifold for transporting a fuel lean charge and a main combustion chamber of the engine. The second inlet port is disposed for establishing simultaneous communication between a second manifold for transporting a fuel-rich charge and a pre-combustion chamber adjacent the main combustion chamber. The exhaust valve is disposed for establishing communication between an exhaust manifold and the main combustion chamber. In a second embodiment of the invention, the inlet passages and the exhaust passages are located in separate valve bodies mounted for rotation within the head. Means are also provided for shielding the exhaust passages from excessive exhaust heat, for sealing the rotary valve body and for controlling the timing of the valve in response to engine demand.

2 Claims, 13 Drawing Figures

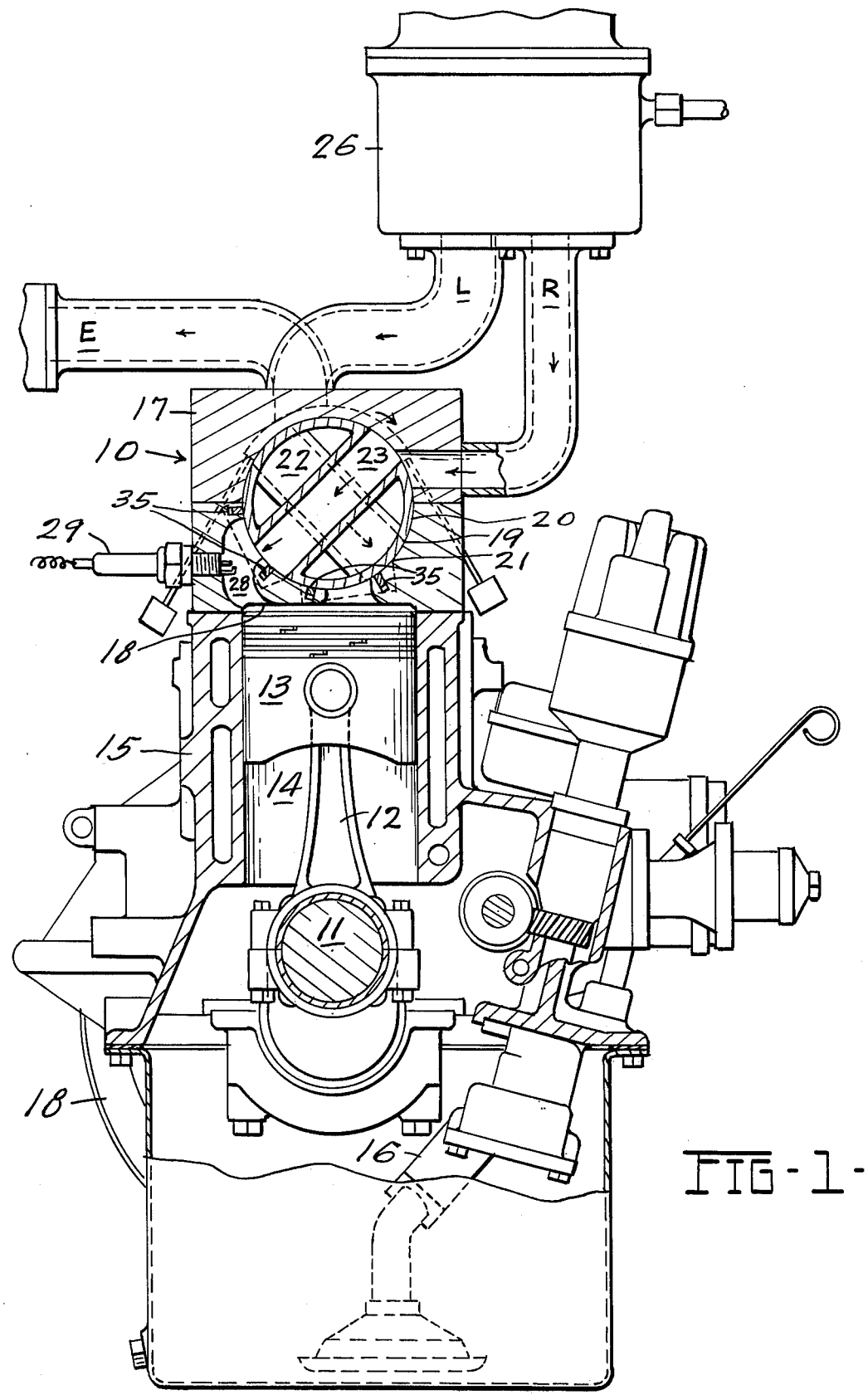
FIG-1-

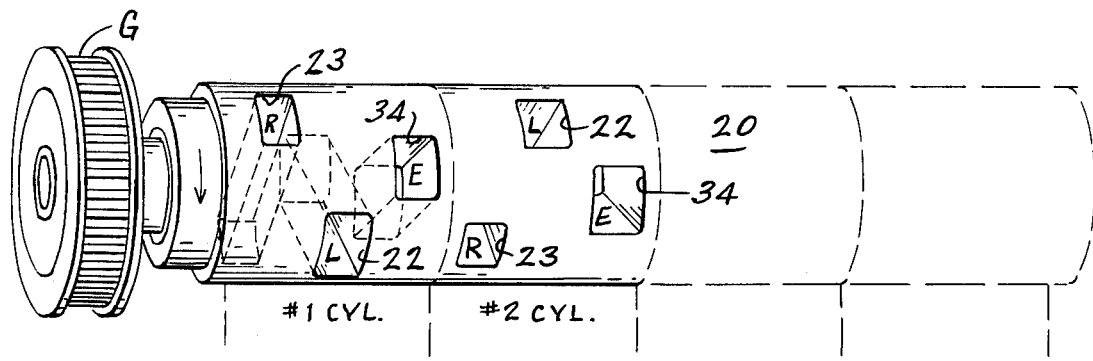
FIG-2-
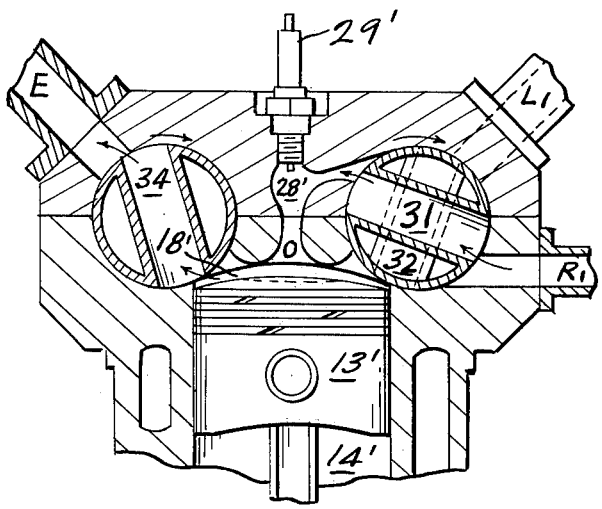
FIG-3-
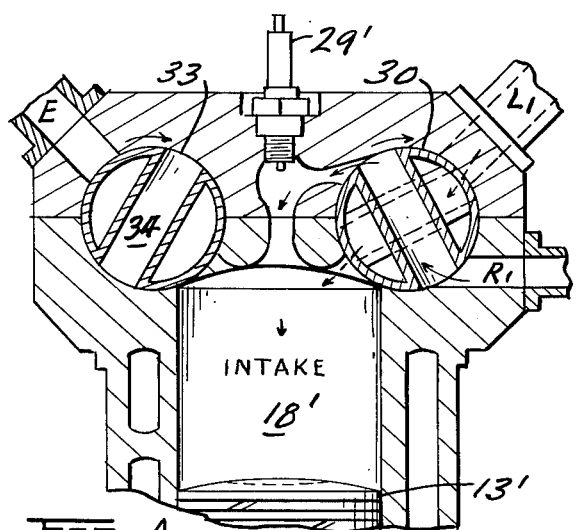
FIG-4-
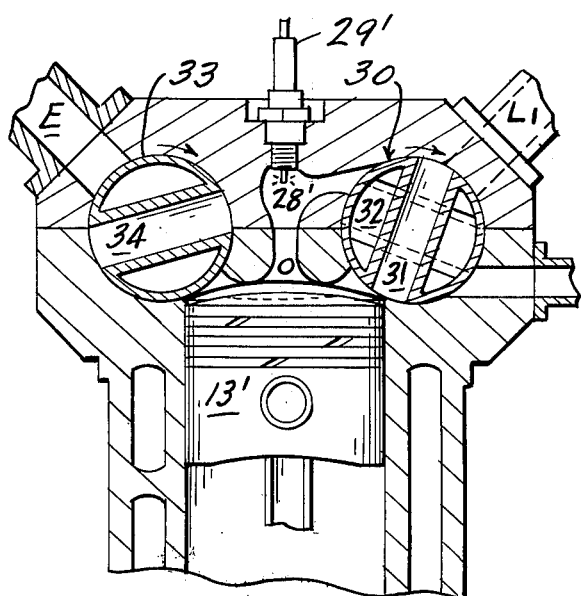
FIG-5-
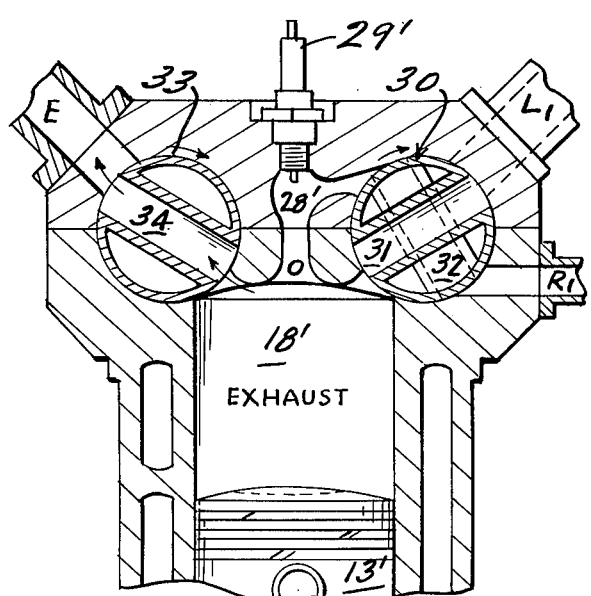
FIG-6-

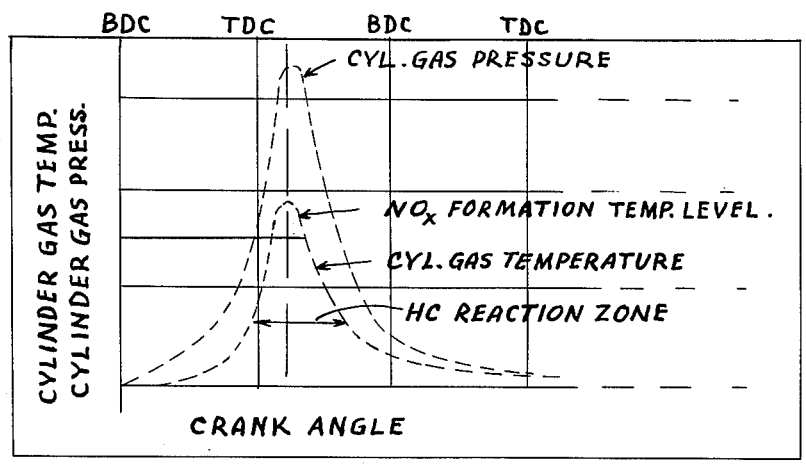
FIG-7-
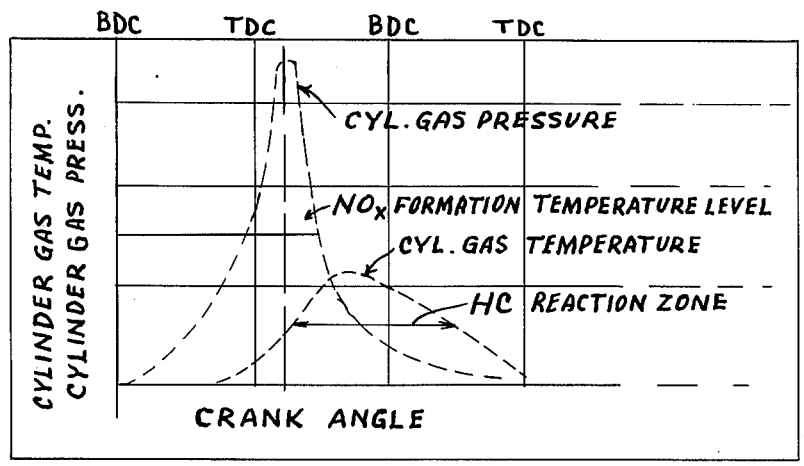
FIG-8-
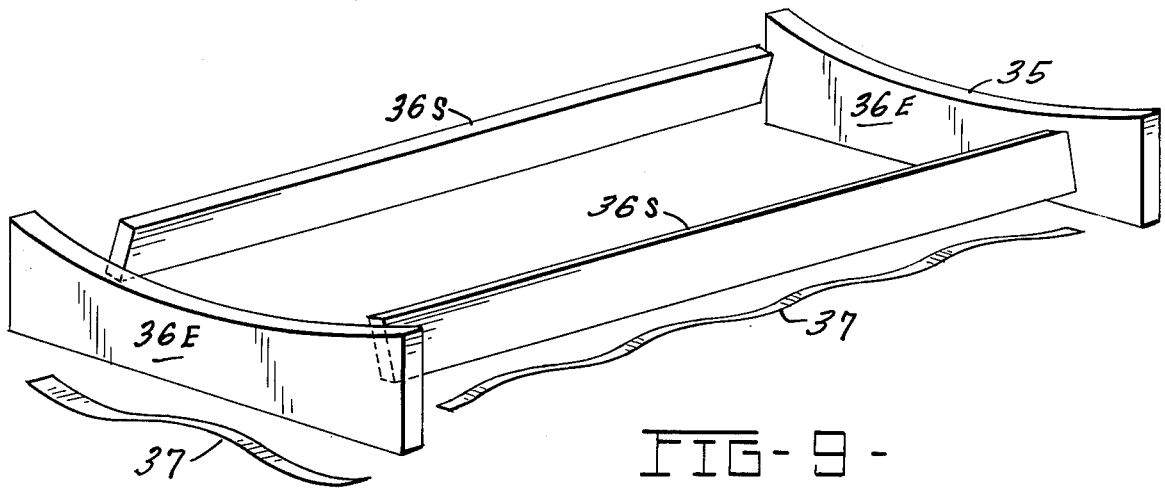
FIG-9-

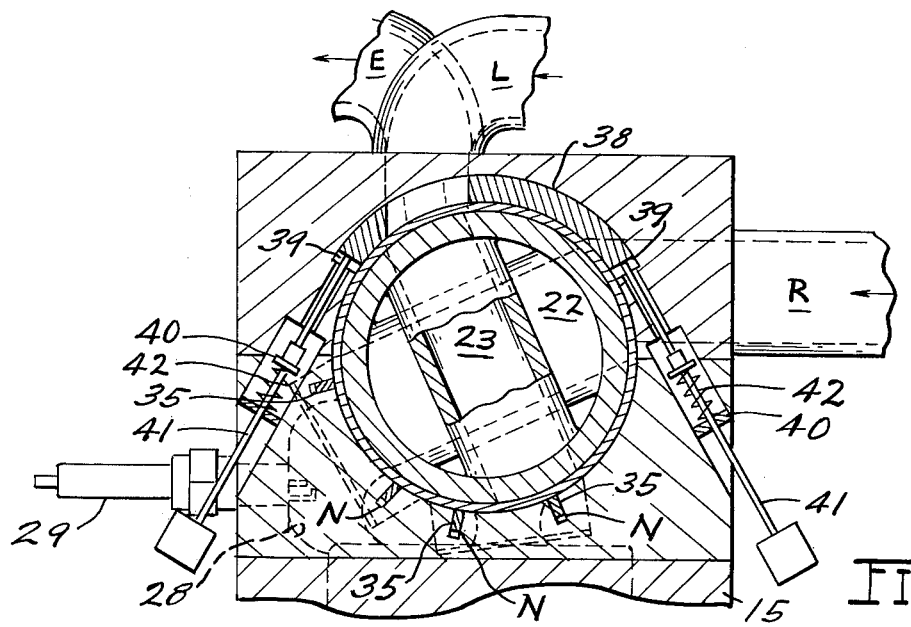
FIG-10-
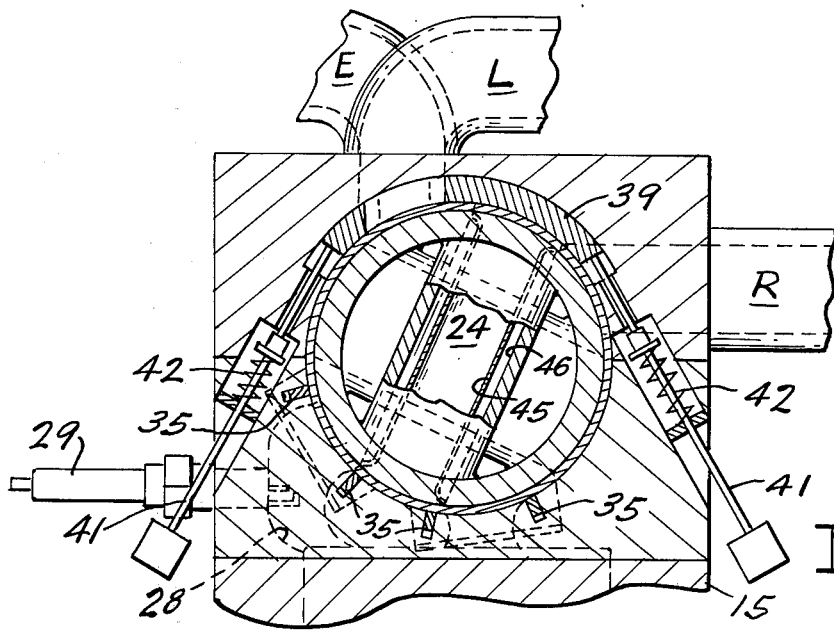
FIG-11-
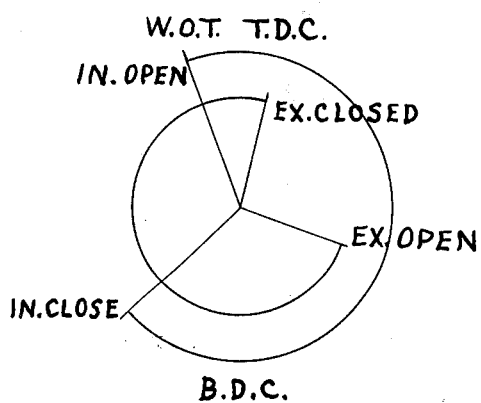
FIG-12-
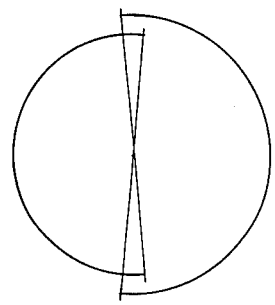
FIG-13-

STRATIFIED CHARGE ENGINE

CROSS REFERENCE TO RELATED APPLICATIONS

This application is a continuation-in-part of my earlier-filed U.S. application Ser. No. 449,241, filed Mar. 8, 1974, now U.S. Pat. No. 3,948,227.

BACKGROUND OF THE INVENTION

The Clean Air Amendment of 1970, which established exhaust emission standards for 1975 and 1976 in light duty vehicles (passenger cars and light trucks), requires that the emissions of carbon monoxide and unburned hydrocarbons be reduced by at least 90 percent, as compared with 1970 emission control standards. Also the emissions of oxides of nitrogen from light duty engines are required to be at least 90 percent below the average of those actually measured from similar vehicles manufactured during the model year 1971. The 1975 standards for cars and light trucks are:

0.41 grams per vehicle mile for hydrocarbons (HC);
3.4 grams per vehicle mile for carbon monoxide (CO); and
3.1 grams per vehicle mile for oxides of nitrogen ($NO_x$).

1976 model year standards are:
0.41 grams per vehicle mile for hydrocarbons;
3.4 grams per vehicle mile for carbon monoxide; and
0.4 grams per vehicle mile for oxides of nitrogen.

The Clean Air Amendments also require vehicle compliance with the above standards for 5 years or 50,000 miles, whichever occurs first.

United States and foreign automobile manufacturers have begun developing various prototype emission control systems which will meet the 1975 standards. These emission control systems have included so-called engine "add on" devices such as:

1. An exhaust-gas recycle (EGR) line and control valve designed to recycle about 10 percent of the exhaust flow to hold $NO_x$ emissions below 3 grams per mile.

2. A catalytic converter in the exhaust system to promote further oxidation of the HC and CO emission from the engine; and 3. A thermal reactor within the exhaust system to promote further burning of HC and CO emissions prior to exhaust into the atmosphere.

Each of these systems has disadvantages. The exhaust gas recycling systems currently in use generally cause a loss of engine power due to a reduction of available air-fuel ratio variations required for smooth engine operation. The use of EGR requires fuel mixture enrichment to maintain adequate drivability which results in an appreciable fuel economy penalty.

Catalytic converters currently being developed require the use of oxidation catalysts comprising noble metals such as platinum and/or palladium or base metals promoted with moble metals deposited on both monolythic and pellet substrates within the engine exhaust system.

Thermal reactors, thus far developed, have required either fuel-rich or fuel-lean mixtures which have resulted in either substantially poor fuel economy (in the case of fuel-rich mixture) or poor drivability (in the case of fuel-lean mixtures).

Among alternate approaches to the "add on" emission control devices is a carbureted stratified charge engine. A prototype of this engine has been developed by Honda of Japan. The engine uses a conventional engine block, pistons and spark plugs. The cylinder head, however, is modified to comprise a small pre-combustion chamber which is in communication with a main combustion chamber. The spark plug is in the small pre-combustion chamber which is fed with a fuel rich mixture through a separate carburetor by using a small third poppet valve. The main carburetor intake system feeds a fuel-lean mixture to the normal intake valve adjacent the main combustion chamber.

The fuel-rich mixture insures good ignition within the pre-combustion chamber. This mixture exits the pre-chamber and propagates a flame into the fuel-lean mixture in the main chamber to produce a burn of relatively long and uniform duration which reduces $NO_x$ formation and promotes total combustion of HC and Co inside the cylinder on the power stroke of the piston.

The Honda engine has been tested and has met the above 1975 standards without the addition of any "add on" emission control devices. It is apparent from the test results thus far published that the carbureted stratified charge engine offers several advantages over the alternate developments devised to meet the Clean Air Act standards, namely:

1. No exhaust treatment need be used in conjunction with the engine;

2. The engine is durable, the 1975 standards have readily been met after completion of the 50,000 mile durability testing as prescribed under the Clean Air Amendment;

3. Effects on vehicle performance are small; there is a slight loss in power for comparable engine displacement due to leaner operation and decreased volumetric efficiency. Fuel economy, as compared with non-stratified charge engines, is essentially unchanged with no fuel penalty resulting from the lowered emissions output; and 4. The engine can operate on regular leaded gasoline, unlike systems having catalytic converters for which lead is a catalyst poison.

Although the stratified charge principle is demonstrably advantageous — both from a clean air and fuel economy aspect — currently existing prototypes which have been tested are even more complex than conventional automotive engines. First, the disclosed engines have a third poppet valve which must be timed in conjunction with engine intake. Second, these stratified charge engines require two separate carburetors having two mechanically linked throttle plates and two separate intake manifolds.

From the standpoints of production cost and post-production maintenance, it is believed that the additional complexity of the currently proposed stratified charge engines will prevent most of them from being readily mass produced in the near future.

The present invention is directed to a simplified apparatus for applying a stratified charge to an engine which eliminates the necessity of separate carburetion apparatus and multiple poppet valves per cylinder. The system comprises a rotary valve having a first lean inlet passage and a rich inlet passage located for separate and respective registry with a lean inlet manifold and a rich inlet manifold, which eliminates the need for any reciprocating valves, valve springs or cam shafts. It is believed that the present invention provides a stratified charge engine which will meet the Clean Air Act requirements, supra, without attendant manufacturing or maintenance difficulties which are present in even conventional automobile engines on the market.

SUMMARY OF THE INVENTION

The invention comprises a cylindrically shaped, driven valve body mounted for rotation within the head of a reciprocating internal combustion engine. The valve body is driven through a timing belt by the engine crank shaft. The valve body defines first and second inlet ports and may also define a single exhaust port for registry with each main combustion chamber of the engine. In a preferred embodiment of the invention, the exhaust port is carried within a second driven valve body for registry with a main combustion chamber of the engine during an exhaust stroke. The first and second inlet ports are axially spaced apart along the valve body. The first inlet port extends diametrically through the valve body for registry with an inlet manifold for transmitting a lean fuel/air charge to the main combustion chamber. The second inlet port is located for simultaneous registry with a second inlet manifold, for carrying a fuel-rich charge to a pre-combustion chamber within the head. The pre-combustion chamber is in communication with the main combustion chamber through an orificed passage extending superadjacent the cylinder. A spark plug extends within the pre-combustion chamber for igniting the fuel-rich mixture induced therein from the second inlet port during the power stroke of the piston.

Rotation of the valve body during the inlet stroke of a piston carries the first and second inlet ports into registry with the respective fuel-lean and fuel-rich inlet manifolds causing the pre-combustion chamber to receive the fuel-rich charge and the main combustion chamber to receive the fuel-lean charge during the downward movement of the piston on the intake stroke.

Further rotation of the valve body by the crankshaft brings the inlet passages of the valve out of communication with the cylinder. The piston then completes its compression stroke; compressing a lean charge in the cylinder and a very rich charge within the pre-combustion chamber. The spark plug within the pre-combustion chamber ignites the rich mixture which propagates a flame front that spreads into the leaner mixture in the cylinder, providing a slow burning, uniform flame growth throughout the power stroke.

Further rotation of the valve brings the cylinder into communication with the exhaust passage which has rotated into communication with the exhaust manifold. The piston exhausts the combusted gases, completing a single fourstroke cycle. In the preferred embodiment of the invention, the separate rotary exhaust valve moves into communication with the exhaust manifold during the exhaust stroke to complete the combustion cycle.

Means are provided for sealing the rotary valve, shielding exhaust heat from the valve body and for providing a variable inlet and exhaust valve timing. The valve seal comprises sealing strip members located adjacent an open end of the cylinders and the inlet and exhaust passages of the valve body. The sealing strips are supported within notches within the head adjacent the intake and exhaust openings. Bias means in the notches maintain each seal in sliding contact with the valve body.

The exhaust shield comprises a heat retentive sleeve within the exhaust passage held in spaced-apart relationship from walls of the exhaust passage by spacers for providing an insulating void space between the sleeve and the passage walls.

The intake and exhaust timing mechanism comprises gate means adjacent the intake and exhaust manifolds which are movable, through actuating means in response to engine demand, into and out of the path of the intake charge and the exhaust gases.

BRIEF DESCRIPTION OF THE DRAWINGS

FIG. 1 is a front end view of the stratified charge engine of the present invention with parts broken away and shown in section;

FIG. 2 is a perspective view of a cylindrical valve body of the stratified charge engine according to the present invention;

FIGS. 3–6 are partial sectional views of a second embodiment of the stratified charge engine of the present invention with parts broken away;

FIGS. 7 and 8 are pressure-temperature graphs illustrating combustion characteristics of the stratified charge engine of the present invention as compared with those of a non-stratified charge engine;

FIG. 9 is a perspective view of valve seals of the stratified charge engine according to the present invention;

FIG. 10 is an enlarged sectional view of a head of the stratified charge engine shown in FIG. 1;

FIG. 11 is a view similar to FIG. 10 showing the exhaust passageway;

FIGS. 12 and 13 are valve timing graphs, illustrating operation of the stratified charge engine comprising the present invention.

DESCRIPTION OF THE PREFERRED EMBODIMENTS

Referring to FIG. 1, a stratified charge engine 10 comprising the present invention is shown. The engine 10 comprises a crank shaft 11, a connecting rod 12 and a piston 13 mounted for reciprocation within a cylinder 14 within an engine block 15. The engine may be of any configuration such as, for example, an in-line 4-cylinder engine having a conventional oil lubrication system 16, electrical system and fly wheel, as are well known in the engine art.

The engine 10 comprises a novel cylinder head 17, connected to the block 15 over the cylinders 14. The cylinder head 17, the cylinder 14 and an upper working surface of each piston 13 define a main combustion chamber 18 within each cylinder 14.

The cylinder head 17 comprises an elongate horizontal bore 19 having a rotatable cylindrical valve body 20 mounted in close registry within the bore 19. The valve body 20 is driven by a belt (not shown) through a driving gear G (see FIG. 2) which is operatively connected to the crankshaft 11. The ratio of revolutions of the crankshaft 11 to those of the valve body is 4:1.

The valve body 20 comprises a cast iron or light alloy frame having a hardened cylindrical outer surface 21. Diametrically extending first and second inlet passages 22 and 23 and diametrically extending exhaust passages 24 are spaced apart axially along the cylindrical valve body 20 and are located for registry with separate intake and exhaust manifolds as will be discussed below.

Referring to a single cylinder, the first inlet passage 22 is located axially within the valve body 20 for registry with a first intake manifold L for transmitting the fuel/lean charge from a first metering device (such as a first venturi within a carburetor 26) to the valve body 20. Rotation of the valve body 20, carrying the first inlet passage 22, brings the inlet passage 22 into simultaneous registry between the lean intake manifold L and the main combustion chamber 18.

As the piston 13 descends on its inlet-stroke the lead fuel/air charge is drawn through the lean intake manifold L into the main combustion chamber 18.

Referring particularly to FIGS. 1 and 10, a second inlet passge 23 is spaced apart axially from the first passage 22 along the valve body 20 and aligned for registry with a second intake manifold R for carrying a second, rich fuel/air charge from a second metering device, such as a second venturi within the carburetor 26. The second inlet passage 23, upon timed rotation of the valve body 20, is aligned for simultaneous registry with the second, rich intake manifold R and with a pre-combustion chamber 28, defined by the head and extending into open communication with the main combustion chamber 18. A spark plug 29 extends within the pre-combustion chamber 28 for igniting the fuel-rich mixture which is drawn therein on an intake stroke of the engine 10.

The charge carrying manifolds L and R enter in open registry with the valve body 20 at points approximately 90 degrees apart. At the same time, the inlet passages 22 and 23 extend diametrically through the valve body at 90 degree angles to one another. The two inlet ports 22 and 23 are therefore situated within the valve body 20 for approximately simultaneous registry with the respective lean and rich charge carrying manifolds L and R and the respective main combustion chamber 18 and pre-combustion chamber 28. Furthermore, the perpendicular relationship of the inlet passages 22 and 23 assures a completely symmetrical timing of the "opening" and "closing" of the passages 22 and 23 as they move in and out of registry with their respective intake manifolds L and R through two complete four-stroke cycles of the engine which effects one complete rotation of the rotary valve body 20. The timing of these intake passages will be discussed below.

Upon a timed rotation of the valve body 20 in conjunction with a down-stroke of the piston 13 on an inlet stroke, the main combustion chamber 18 is supplied with a fuel-lean mixture and simultaneously the pre-combustion chamber 28 is supplied with a fuel-rich mixture. The onset and duration of registry of the inlet passages 22 and 23 can be determined by varying the angular position of the edges of the openings into the main combustion chamber 18 and the pre-combustion chamber 28 from the valve body 20 as will be discussed below. Further rotation of the valve body 20 brings the inlet passages 22 and 23 out of registry with the respective combustion chambes 18 and 28 as the piston 13 commences its compression stroke as will be discussed below.

Referring now to FIGS. 3-6, a second embodiment of the stratified charge engine of the present invention is shown. In this embodiment, and again referring to a single cylinder, a first rotatable valve body 30 carries first and second inlet passages 31 and 32 for respective registry with a first lean intake manifold L' and a main combustion chamber 18' and a second rich intake manifold R' and a pre-combustion chamber 28'. The pre-combustion chamber 28' is in communication with the main combustion chamber 18' through an orifice located adjacent the axis of the piston 13'. The second inlet passage 32 establishes communication between the lean intake manifold L, and the main combustion chamber 18' at a point near the outer circumference of the cylinder 14' within the head 11. Upon the inlet stroke of the piston 13' the respective inlet passages 31 and 32 rotate into approximately simultaneous registry with the respective combustion chambers 18' and 28' for supplying a lean charge to the main combustion chamber 18' and a rich charge to the pre-combustion chamber 28' as discussed above in the description of the single-valved embodiment of the invention.

A second valve body 33 within the cylinder head 17' carries an exhaust passage 34, and is driven in timed rotation by the crankshaft 11 through the timing chain not shown. As will be explained below, the exhaust passage 34 is rotated into communication with the main combustion chamber 18' upon an exhaust stroke of the piston 13'.

The operation of the single-valved embodiment illustrated in FIGS. 1 and 2 and that of the dual-valved embodiment illustrated in FIGS. 3-6 is similar. It has been found, however, that the dual-valved embodiment of the present invention is preferred for the reasons that the valve bodies 30 and 33 may be of a smaller diameter than that of the single valve bodied engine shown in FIG. 1 and because the pre-combustion chamber 28' can be readily located adjacent the axis of the piston 13' for optimum flame propagation into the main combustion chamber. Since the operation of the engine of each embodiment is substantially similar, the following discussion of the operation of the engine as illustrated in FIGS. 3-6 will also substantially apply to the operation of the single valve bodied engine as shown in FIG. 1.

In operation, the inlet and exhaust valve bodies 30 and 33 rotate in relation to the crankshaft at a ratio of 1 revolution of the valve bodies 30 and 33 for every 4 revolutions of the crankshaft 11. The valve bodies rotate in a clockwise direction as viewed in FIGS. 1 and 3-6. Therefore, for every single stroke of the piston 13' the valve bodies 30 and 33 rotate one quarter of a turn or 90° about their axes within their respective bores 19 in the cylinder head 17. Therefore, in a 4-stroke cycle, the engine operates as follows:

As the piston reaches top dead center following an exhaust stroke as illustrated in FIG. 3, the exhaust passage 34 rotates into only partial registry with the main combustion chamber 18' and an exhaust manifold E. At the same time, the first and second inlet passages 31 and 32 have moved partially into communication with their respective combustion chambers 28' and 18', as explained above. With both the exhaust passage 34 and the inlet passages 31 and 32 thus in registry with the combustion chambers, optimum scavenging of the chambers 18' and 28' is effected. The amount of this "valve overlap" is optimumly determined by various engine design characteristics and demands which are conventionally known in the art.

As the piston 13' commences its downward intake stroke as shown in FIG. 4, the exhaust passage 34 is rotated out of registry with the main combustion chamber 18', thus "closing" the exhaust valve body. At the same time, the inlet passages 31 and 32 rotate into maximum open registry with the pre-combustion chamber 28' and the main combustion chamber 18' respectively. A rich charge is thus drawn through the rich intake manifold R and the inlet passage 31 into the pre-combustion chamber 28'. At the same time, a lean charge is transported through the second, lean intake manifold L and the second inlet passage 32 into the primary combustion chamber 18' as explained above.

As the piston 13' reaches bottom dead center on the intake stroke (or slightly passes bottom dead center, depending upon the desired valve timing as will be discussed below), the first inlet valve body 30 has rotated a full 90 degrees carrying the inlet passages 31 and 32 out of registry with the combustion chambers 18' and 28' as well as the charge carrying manifolds L and R. The inlet valve is thus "closed" to provide for the compression stroke of the engine as shown in FIG. 5.

As the piston approaches top dead center, the spark plug 29' is energized through a conventional coil and distributor electrical system to ignite the rich mixture trapped in the pre-combustion chamber 28'. As the mixture ignites, a flame propagates from the pre-combustion chamber into the lean mixture in the primary combustion chamber to effect a long, and relatively uniform burn of the fuel charge as the piston 13' commences its downward power stroke.

As the piston 13' commences its ascending exhaust stroke, the exhaust passage 34 once again begins to rotate into registry with the primary combustion chamber 18' to effect discharge of the burned combustion gases within the primary combustion chamber 18'. As the piston 13' approaches top dead center, the inlet passages 31 and 32 again begin to rotate into communication with the combustion chambers 18' and 28' to effect "valve overlap" to enhance the scavenging effect as discussed above. The engine subsequently repeats the 4 strokes of the conventional 4-stroke cycle.

Referring now to FIGS. 7 and 8, the combustion pressure-temperature curve of the stratified charge (FIG. 8) as the flame propagates from the pre-combustion chamber 28 into the main combustion chamber 18 during the power stroke, is compared with the pressure-temperature combustion curve of a conventional non-stratified charge engine (FIG. 7). When ignition takes place, at a point near top dead center (TDC.), the cylinder pressure in both engines builds rapidly as is illustrated by the dotted line curves.

In the conventional engine (FIG. 7), the gas temperature increases at a rapid rate to reach a high peak followed by a rapid fall-off within a short duration of movement of the crank toward bottom dead center (BCD.), as illustrated by the dash line curve of FIG. 7. This short duration/high peak ignition curve first provides a short time during which maximum hydrocarbon combustion temperatures are maintained (HC Reaction Zone) and second, achieves a high temperature peak ("NO$_x$ formation zone") at which oxides of nitrogen are formed.

The temperature curve of the relatively slow propagating flame produced in the stratified charge engine (FIG. 8), however, provides a long-duration burn above minimum hydrocarbon combustion temperatures and at the same time achieves a peak temperature which is below that required to produce oxides of nitrogen.

As compared with the conventional engine, therefore, the production of each HC and NO$_x$ pollutents during the power stroke is significantly reduced in the stratified charge engine.

Referring to FIGS. 9 and 10, a sealing apparatus 35 for providing end and side seals for the valve body 20 is shown. The sealing apparatus 35 comprises elongate strips 36 of a sealing material such as compressed carbon or the like, the end seals 36E being of a configuration complementary to the circumferential end surface of the valve body 20 and the side seals 36S being angled for sliding contact of a top surface of the strips against the valve body 20. The valve body 20 is preferably coated with a hard outer covering such as chromium or comparable materials chosen for compatibility with the sealing material selected. As shown in FIG. 1, the sealing strips are placed within notches N machined in the head 17 adjacent openings into the elongate bore 19 for registry with the two inlet passages 22 and 23 and the exhaust passage 24. The sealing strips 36 are biased against the outer surface of the valve body 20 by spring strips 37 which are sandwiched between the sealing strips 36 are the bottommost portion of each notch N within the head 17 for receiving the sealing strips 36. The spring strips 37 preferably comprise a resilient undulating stainless steel member for urging the sealing strips 36 into sliding relationship with the valve body 20.

Referring now to FIGS. 10–13, an apparatus for varying the timing of the inlet passage 22 and the exhaust passage 24 is shown. Arcuate slide seals 38 are within oppositely extending arcuate channels 39 on opposite sides of the inlet passage L and the exhaust passage E. The slide seals 38 are fitted for complementary, contiguous registry with the valve body 20 and form upper seals for the body adjacent the respective inlet and exhaust passages L and E. The slide seals 38 are extensible form a retracted position within the channel 39 to a restricting position within the path of the inlet or exhaust passages L and E, as indicated by the dashed lines of FIGS. 10 and 11.

The slide seals 38 are movable by means of an actuating mechanism 40 which can comprise any suitable apparatus for moving the seals 38 in response to engine demand. For example, the actuating mechanism 40 can be connected for vacuum operation to move sets of timing rods 41 which are connected to the seals 38. The seals 38 are biased away from their restricting position by bias springs 42 connected to the timing rods 41. An increase in vacuum within the actuating mechanism 40 moves the seals 53 toward their restricting position. Therefore connection of the actuating mechanism 40 to a port below a throttle plate (not shown), for example, will cause the seals to be urged to their restricting position during engine idle conditions (a high vacuum condition) and toward their retracted position during open throttle conditions (a low vacuum condition).

To accomplish timing of the registry of the lean inlet passage 22 with the lean intake manifold L, the slide seals 38 are moved in response to engine demand as described above. Thus when the engine is in an idle condition, the slide seals 38 extend from the opposing channels 39 into the restricting position as shown in the dashed lines of FIG. 10. Movement of the left-hand seal, as viewed in FIG. 10, causes the inlet passages 22 to move into registry with the lean intake manifold L later than when the seal 38 is in its restricted position. Movement of the right-hand seal 38 into the restricting position causes the intake passage 22 to move out of registry with the intake manifold L relatively sooner.

Similarly, movement of the left-hand seal 38, as viewed in FIG. 11, causes the exhaust passage 24 to move into registry with an exhaust manifold E later than when the seal 38 is in its retracted position. Likewise, movement of the right-hand seal 38 into the restricting position causes the exhaust passage 24 to move out of registry with the exhaust manifold E relatively sooner.

It has been found that the timing of the intake valve can be adjusted as describd above without providing for adjustable timing of the rich inlet passage 23. The inlet passage 23, which provides for timed registry between the rich intake manifold R and the pre-combustion chamber 28, can be timed in accordance with averge engine demand requirements through the establishment of a fixed opening size of the pre-combustion chamber 28.

The provision of variable timing response to engine demand is significant because in modern engine design it is usual to effect the opening of the inlet valve before the piston reaches the top of the exhaust stroke. The valving is timed so that the exhaust valve closes after the inlet has opened so that there is "overlap" — a pre-determined period when both inlet and exhaust valves are open together. This valve overlap is provided to produce maximum power during wide open throttle or high demand periods of engine operation. In the high demand condition, high-velocity escaping exhaust gases during an exhaust stroke, create a near-atmospheric pressure (or a slightly negative pressure) within the exhaust port. At the sme time, a charge in the induction column is under a positive pressure.

When the inlet valve opens on the exhaust stroke, therefore, the positive pressure charge in the induction manifold sweeps into the cylinder and forces the remaining combusted gases out through the open exhaust valve. The scavenging effect of the new charge pushing out the old assures that a maximum charge is drawn into the engine absent substantially all combusted gases.

Furthermore, to assure that a maximum charge is introduced into the cylinder, the inlet valve is commonly closed at a point after the piston reaches the bottom of the intake stroke. During high engine demand, the positive pressure of the charge within the induction manifold maintains a positive flow into the cylinder even though the piston has begun its upward travel on the compression stroke.

It is also common practice to cause the exhaust valve to open at a point before the piston reaches the bottom of the power stroke in order to assure that the exhaust valve is completely open throughout the exhaust stroke. During periods of high demand, the piston speed, as well as the highly efficient combustion environment of the cylinder, assure that relatively few unburned hydrocarbons or raw fuel escape through the exhaust passage. This above-described valve timing provides a relatively ideal combustion environment within the cylinder during periods of high engine demand. Therefore, a conventionally timed valving system in an automotive engine has a cycle similar to that illustrated in FIG. 12, In that cycle, the intake valve opens at approximately 22° of crank angle before top dead center and closes at 66° after bottom dead center. The exhaust opens at 65° before botom center and closes at 24° after top center.

Under idle conditions, however, the above-described timing becomes detrimental to engine operation. During idle, there is a high degree of vacuum in the intake tract. When the piston reaches the top of its travel during the exhaust stroke, the pressure of the gases inside the cylinders is considerably above that of the atmosphere, while inside the induction manifold it is a good deal below. Therefore, at the moment of opening the inlet valve, there is a pronounced difference of pressure across the valve orifice which causes some of the exhaust gases to be drawn into the intake manifold. When the piston begins to move down on the intake stroke, a portion of the inspired charge will consist of exhaust gases, thus reducing combustion efficiency within the cylinder.

Furthermore, because the exhaust valve typically opens prior to the completion of the power stroke, the charge within the cylinder begins to exhaust before combustion in the relatively poor environment is complete. This results in the admission of the unburned hydrocarbons and even raw fuel into the exhaust manifold, increasing the fuel comsumption of the engine and also emissions outputs.

The provision of the adjustable slide seals 38, however, provides for variation in the timing of the inlet and exhaust passages 23 and 24 to smooth out engine idle operation and reduce fuel consumption and emission outputs. Thus, as the opposing seals 38 are moved into the restricting position during engine idle, both passages 22 and 24 are caused to "open" late (due to the restriction caused by the left-hand seal 38) at top dead center and to "close" early (due to the restriction caused by the right-hand seal 38) at bottom dead center, as is depicted in the graph of FIG. 13.

As a result of the movement of the seals 38 into their restricting position, (1) valve overlap is virtually eliminated during idle and (2) the exhaust passage 24 does not move into registry with the exhaust manifold E until the piston reaches virtually bottom dead center. The elimination of both valve overlap and the early opening of the exhaust port in response to a reduction in engine demand assures that combustion gases will not be introduced into the inlet passage 22 on the exhaust stroke and also assures that complete combustion takes place in the main combustion chamber 18 prior to the "opening" of the exhaust passage 24. Engine idle speed can therefore be reduced without the conventional attendant rough running, high fuel consumption and high pollution output.

Referring especially to FIG. 11, the exhaust passage 24 is provided with an inner liner 45 having a metal surface of a heat absorptive alloy, such as stainless steel which extends across each wall of the exhaust passage 24. Opposite ends of the inner liner 45 are bent for registry with an extending portion of the sleeve of the valve body 32. The bends act as spacers to maintain the surface of the liner 45 away from each wall of the exhaust passage 24. A dead air space 46 between the wall of the exhaust passage and the liner 45 provides an insulating layer against exiting exhaust gases.

As the exhaust passage 24 rotates into registry with the main combustion chamber 18, at one end, and the exhaust manifold E, at its opposite end, during an exhaust cycle of the piston 13, the hot, highly pressurized gases are released from the main combustion chamber 18 to flow over the surface of the liner 45. During engine operation, therefore, the liner 45 will be maintained at a red-hot temperature.

In the event that a catalytic converter or thermal reactor is used in treating the exhaust of the engine, the red-hot temperature of the liner is advantageous in that the exit temperature of the exhaust gases is maintained at a high level which promotes the treating activity of either the catalytic converter or a thermal reactor.

Furthermore, the dead air space 46 provides an insulating area between the liner 45 and each wall of the exhaust passage 24. The valve body 32 is thereby shielded from localized exhaust gas heat.

The valve body 32 is provided with cooling passages C' which extend axially through the body 32 and are supplied with water from the engine cooling system. The provision of the liners 45 in the exhaust passage 24 permits the uniform cooling of the valve body 32 with cooling fluid, reducing localized hot spots in the valve body 32 around the area of each exhaust passage 24 therein.

It is to be understood that the above-discussed embodiments are illustrative of the stratified charge engine of the present invention and not limiting to the scope and effect of the following claims:

What I claim is:

1. A stratified charge engine comprising an engine block, a cylinder within said block, a piston mounted for reciprocation within said cylinder and defining therewith a main combustion chamber, a pre-combustion chamber in open communication with said main combustion chamber, first and second valve bodies adjacent said cylinder, a first inlet passage for transmitting a lean fuel/air charge from a metering device to said first valve body, a second inlet passage for transmitting a rich fuel/air charge from a metering device to said first valve body, a first inlet port in said first valve body for establishing communication between said first inlet passage and said main combustion chamber upon rotation of said valve body to a predetermined position, a second inlet port in said first valve body for establishing communication between said second inlet passage and said pre-combustion chamber upon rotation of said valve body to such predetermined position, an exhaust port defined through said second valve body for registry with said main combustion chamber upon rotation of said second valve body to a predetermined position, means responsive to engine load for adjusting timing of the establishment of sequential communication of said first inlet port and said exhaust port with said first inlet passage and said exhaust manifold respectively wherein the time of communication is controlled in response to engine load when the piston is adjacent top dead center and also when the piston is adjacent bottom dead center during normal intake and exhaust cycles of the engine.

2. Engine apparatus according to claim 1 wherein said timing adjustment means comprises sets of opposing arcuate members within said head, each set being adjacent one of said inlet passages or one of said outlet passages, on one side, and circumferentially adjacent one of said inlet or one of said exhaust passages on an opposite side of said arcuate members, said members being movable from a retracted position toward each other to a restricting position in interference with the path of communication estabished by said rotating valve body between said inlet port and said inlet passage and then said exhaust port and said exhaust manifold.

* * * * *